United States Patent Office 3,305,505
Patented Feb. 21, 1967

3,305,505
LATEX COATING COMPOSITION
Walter S. Ropp, Hockessin, Del., assignor to Hercules Incorporated, a corporation of Delaware
No Drawing. Filed Apr. 14, 1961, Ser. No. 102,931
13 Claims. (Cl. 260—29.6)

This invention relates to fortified latex coating compositions and to a process for their preparation. More particularly, the invention relates to water-based coating compositions comprising synthetic polymer latexes fortified with aqueous interpolymer solutions and to the process of preparing such coating compositions.

Aqueous dispersions, i.e., latices, of finely divided synthetic polymers have in the past been used in coating compositions with less than completely satisfactory results. In fact, the prior art latex coating compositions suffer a number of serious drawbacks. The most important drawback is the fact that the prior art latex coatings have been too soft for industrial finishes. When the latex polymer is one which might give hard films, the latex particles are reluctant to coalesce. Hence, hard, continuous films do not result.

It has now been discovered that latex coating compositions can be prepared which form hard, continuous films by fortifying a synthetic polymer latex with an aqueous solution of an amine or ammonia salt of the interpolymer of maleic anhydride with the monomeric components of the synthetic polymer.

Accordingly, the present invention relates to a fortified latex coating composition comprising an aqueous dispersion of hard, synthetic polymer particles in an aqueous solution of the salt of the interpolymer resulting from the polymerization of maleic anhydride with the monomeric components of the synthetic polymer, said salt being selected from the group consisting of amine salts and ammonia salts and to a process for the preparation of said coating composition.

Any finely divided, hard, synthetic polymer can form the latex which is fortified in accordance with this invention. By "finely divided" is meant particles ranging in size from about 0.1 micron to about 100 microns in diameter. Exemplary of the latices that can be fortified are those latices obtained from the emulsion polymerization of ethylenically unsaturated monomers such as acrylonitrile; acrylic acid; the esters of acrylic or fumaric acid with alcohols containing not more than 18 carbon atoms; methyl methacrylate and its homologues; styrene and its ring-substituted derivatives; alpha-methyl styrene and its ring-substituted derivatives; the vinyl halides; the vinyl ethers such as vinyl alkyl ethers, vinyl alkoxyalkyl ethers, vinyl aralkyl ethers, etc.; the vinylidine halides, etc. The latex can comprise a homopolymer of one of the above monomers, a copolymer of two or more of the above monomers, or a copolymer of one of the above monomers with a conjugated polyolefin. The emulsion polymerization of these monomers is well known in the art and need not be described here.

The latexes of the prior art generally contain a surface-active agent, such as a cationic, anionic, or nonionic agent, to prevent agglomeration of polymer particles. Any of the well-known surface-active agents, but preferably the nonionics, can be used in the fortified latex coating compositions of this invention; however, it is also possible to use the salts of the maleic anhydride interpolymers as surface-active agents. Which agent is used and in what amount will depend on the specific composition of the coating and its intended use.

The maleic anhydride interpolymers used in this invention are the interpolymers resulting from the polymerization of maleic anhydride with the monomeric components of the synthetic polymer forming the latex. In other words, the composition of the interpolymer is determined by the synthetic polymer forming the latex. Interpolymers of maleic anhydride with monomers differing from those of the latex will not fortify the latex. The amount of maleic anhydride units in the interpolymer must be sufficient to confer water solubility to the subsequent interpolymer salt. In general, from about 10 to about 50 mole percent and more preferably from about 20 to about 30 mole percent of maleic anhydride is sufficient. The interpolymers can be prepared by any of the well-known polymerization techniques, such as bulk, solution, or emulsion procedures.

These interpolymers are used in the form of aqueous solutions of their ammonia or amine salts. Primary, secondary, or tertiary amines can be used in the formation of the salts. Exemplary amines are n-amylamine, aniline, morpholine, N-methyl morpholine, N-ethyl morpholine, o-toluidine, N,N'-dimethyl ethanolamine, methyl ethanolamine, triethyl amine, etc. In general, when preparing the salt sufficient salt-forming component is added to the interpolymer to completely hydrolyze the anhydride groups. However, an interpolymer with efficient fortifying properties can be prepared when using less than stoichiometric amounts of salt-forming components. In some cases it may be desirable to first treat the maleic anhydride interpolymer with an alcohol such as ethanol, butanol, propanol, etc., to form a half-ester and then treat the half-ester with ammonia or an amine to form a salt. It is thought that the half-ester prevents the reforming of anhydrides during baking. Whether such pretreatment of the interpolymer is desirable will depend upon the composition of the coating and the intended use.

In carrying out the process of this invention, the fortified latex coating composition is most preferably prepared by slowly adding the aqueous solution of the salt of the interpolymer to the aqueous dispersion of the finely divided synthetic polymer. In some cases it may be desirable to filter the fortified latex coating composition before use to remove any large particles; however, such a procedure is not necessary. The ratio of finely divided synthetic polymer to interpolymer, expressed as emulsion solids to solution solids, $E/S$ (called the fortification ratio), will vary from about 1 to about 10 and more preferably from about 2 to about 5.

The fortified latex coating compositions of this invention can and often do contain other ingredients such as thickeners, stabilizers, dyes, pigments, dryers, plasticizers, etc., but the presence or absence of such ingredients is immaterial to the invention.

The following examples are presented for purposes of illustration, parts and percentages being by weight unless otherwise specified. The molecular weight of the polymers in these examples is indicated by the Reduced Specific Viscosity (RSV) given for each. By the term "Reduced Specific Viscosity" is meant the $\eta_{sp.}/c$ of a 0.1% solution (0.1 gram of the polymer per 100 ml. of solution) of the polymer determined at a temperature of 25° C.

*Example 1*

A latex of a copolymer of tert-butyl vinyl ether and acrylonitrile was prepared by an emulsion polymerization process using p-menthane hydroperoxide as the initiator and a lauryl alcohol adduct of poly(ethylene oxide) as the emulsifying agent. The resulting copolymer contained 44% acrylonitrile, 56% tert-butyl vinyl ether, and had an RSV of 3.3 as determined in dimethylformamide. The latex had a solids content of 50%.

A maleic anhydride—tert-butyl vinyl ether—acrylonitrile interpolymer was prepared by a solution polymerization process using cumene hydroperoxide as the initiator. The resulting interpolymer contained 55% tert-butyl vinyl ether, 11% acrylonitrile, 34% maleic anhydride, and had an RSV of 0.66 as determined in dimethylformamide. This interpolymer was converted to its half-ester by treating its methyl isobutyl ketone solution with butanol at a temperature of 110° C. The resulting product had an acid number of 248. To 270 parts of water, at a temperature of 60° C., was added with stirring 50 parts of the above-treated interpolymer and 17.4 parts of morpholine. The stirring was continued for 3 hours during which time the interpolymer went into solution forming a cream-colored, slightly viscous liquid containing 20% solids.

A fortified latex coating composition was prepared by adding dropwise with stirring a sufficient amount of the above interpolymer solution to the above latex to give a fortification ratio of 2. The resulting fortified latex was filtered through a coarse frit under pressure to give a white, opaque, slightly viscous latex. Films of 5 mil thickness were prepared with a casting knife on 4" x 8" glass panels and wet-baked at 170° C. for 30 minutes. Hard, continuous, water-resistant films were obtained which had a Sward hardness of 30. A control casting from an identical latex, except for the fact it was not fortified, when baked under the same conditions did not produce a continuous film.

*Example 2*

A latex of a copolymer of α-methyl styrene and acrylonitrile was prepared by an emulsion polymerization process as described in Example 1. The resulting copolymer contained 27% acrylonitrile, 73% α-methyl styrene, and had an RSV of 4.4 as determined in dimethylformamide. The latex had a solids content of 38%.

A maleic anhydride—α-methyl styrene—acrylonitrile interpolymer was prepared by a solution polymerization process as described in Example 1. The resulting interpolymer contained 8% acrylonitrile, 51% α-methyl styrene, 41% maleic anhydride, and had an RSV of 1.0 as determined in dimethylformamide. This interpolymer was converted to its butyl half-ester by treatment with a 50:50 solution of butanol to acetone at reflux temperature. To 266 parts of water, at a temperature of 70° C., was added with stirring 25 parts of the thus treated interpolymer and 4.5 parts of morpholine. The stirring was continued for 6 hours during which time the interpolymer went into solution forming a translucent viscous liquid containing 14% solids. A fortified latex coating composition having a fortification ratio of 2 was prepared as described in Example 1. Films of 5 mil thickness were cast as described in Example 1 and wet-baked at a temperature of 200° C. for 15 minutes. Hard, continuous, water-resistant films were obtained. A control casting from an identical latex, except for the fact it was not fortified, when baked under the same conditions did not produce a continuous film.

*Example 3*

A latex of a copolymer of methyl methacrylate and butyl acrylate was prepared by an emulsion polymerization process using ammonium persulfate as the initiator and a sodium lauryl sulfate as the emulsifying agent. The resulting copolymer contained 80% methyl methacrylate, 20% butyl acrylate, and had an RSV of 7.5 as determined in dichloroethane. The latex had a solids content of 40%.

A maleic anhydride—methyl methacrylate—butyl acrylate interpolymer was prepared by a solution polymerization process using dicumyl peroxide as the initiator. The resulting interpolymer contained 85% methyl methacrylate, 5% butyl acrylate, and 10% maleic anhydride, and had an RSV of 0.3 determined in dimethylformamide. This interpolymer had an acid number of 92. The interpolymer was converted to its half-ester by treating its acetone solution with butanol at reflux. To 230 parts of water, at a temperature of 60° C., was added with stirring 25 parts of the above-treated interpolymer and 3.6 parts of morpholine. The stirring was continued for one hour during which time the interpolymer went into solution forming a clear, colorless liquid containing 10% solids. A fortified latex coating composition having a fortification ratio of 2 was prepared as described in Example 1. Films of 10 mil thickness were cast as described in Example 1 and wet-baked at a temperature of 170° C. for 30 minutes. Hard, continuous, water-resistant films were obtained. A control film cast from the identical latex, except for the fact it was not fortified, when baked under the same conditions did not produce a continuous film.

*Example 4*

A latex of a copolymer of methyl methacrylate and α-methyl styrene was prepared by an emulsion polymerization process using p-methane hydroperoxide as the initiator and a sodium lauryl sulfate as the emulsifier. The resulting copolymer contained 50% methyl methacrylate, 50% α-methyl styrene, and had an RSV of 3.4 as determined in ethylene dichloride. The latex had a solids content of 33%.

A maleic anhydride—methyl methacrylate—α-methyl styrene interpolymer was prepared by a solution polymerization process using dicumyl peroxide as the initiator. The resulting interpolymer contained 20% maleic anhydride, 40% methyl methacrylate, 40% α-methyl styrene, and had an RSV of 0.8 as determined in ethylene dichloride. The interpolymer was converted to its half-ester by treating its toluene solution with butanol at a temperature of 90° C. To 135 parts of water, at a temperature of 65° C., was added with stirring 25 parts of the thus treated interpolymer and 9 parts of morpholine. The stirring was continued for 6 hours during which time the interpolymer went into solution forming an opaque, cream-colored liquid containing 21% solids. A fortified latex coating composition having a fortification ratio of 2 was prepared as described in Example 1. Films of 5 mil thickness were cast as described in Example 1 and wet-baked at a temperature of 200° C. for 15 minutes. Hard, continuous, water-resistant films were obtained. A control casting from an identical lattex, except for the fact it was not fortified, when baked under the same conditions did not produce a continuous film.

*Example 5*

A fortified latex coating composition was prepared from the copolymer latex described in Example 1 and a non-esterified interpolymer salt as follows:

The maleic anhydride—tert-butyl vinyl ether—acrylonitrile interpolymer of Example 1 was dissolved in water by stirring 1.0 part of the interpolymer with 95 parts of water and 5 parts of concentrated aqueous NH$_4$OH. The stirring was continued for several hours during which time the interpolymer went into solution forming a clear, colorless, somewhat viscous solution containing 1.8% solids. The resulting interpolymer salt solution was then added dropwise with stirring into the poly(tert-butyl vinyl ether—acrylonitrile) latex in an amount sufficient to give a fortification ratio of 5. The resulting fortified latex was filtered and films of 10 mil thickness were cast as described in Example 1 and wet-baked at a temperature of 150° C. for 30 minutes. Hard, continuous, clear, water-resistant films were obtained. A control casting from an identical latex, except for the fact it was not fortified, when baked under the same conditions did not produce a continuous film.

*Example 6*

A polystyrene latex was prepared by an emulsion polymerization process using p-menthane hydroperoxide as the initiator and a lauryl alcohol adduct of poly(ethylene oxide) as the emulsifying agent. The resulting copolymer had an RSV of 4.0 as determined in dimethylformamide and a solids content of 38%.

A styrene—maleic anhydride interpolymer was prepared by a solution polymerization process as described in Example 1. The resulting interpolymer contained 65% styrene, 35% maleic anhydride, and had an RSV of 0.9 as determined in dimethylformamide. This interpolymer was converted to its butyl half-ester by the process described in Example 1. To 290 parts of water, at a temperature of 60° C., was added with stirring 50 parts of the half-butyl ester of the interpolymer and 17 parts of morpholine. The stirring was continued for three hours during which time the interpolymer went into solution forming a clear liquid containing 10% solids. A fortified latex coating composition having a fortification ratio of 2 was prepared as described in Example 1. Films of 10 mil thicknes were cast as described in Example 1 and wet-baked at a temperature of 170° C. for 30 minutes. Hard, continuous, slightly hazy, water-resistant films were obtained. A control casting from an identical latex, except for the fact it was not fortified, when baked under the same conditions did not produce a continuous film.

The fortified latex coating compositions of this invention can be used in all areas common to latex coatings. They can be applied in any of the usual ways, i.e., by brushing, rolling, dipping, or spraying (including airless spraying). Because the fortified latex coating compositions of this invention produce hard, continuous films they are particularly advantageous in preparing industrial coatings, both as primers and topcoats.

What I claim and desire to protect by Letters Patent is:

1. A latex coating composition consisting essentially of finely divided hard particles of a copolymer of at least two ethylenically unsaturated monomers selected from the group consisting of acrylonitrile, acrylic acid, the esters of acrylic, fumaric and methacrylic acids with alcohols containing not more than 18 carbon atoms, styrene, alpha-methyl styrene, vinyl halides, vinyl ethers, and vinylidine halides, dispersed in an aqueous solution of the salt of the interpolymer resulting from the polymerization of maleic anhydride with the monomeric components of the copolymer, said salt being selected from the group consisting of amine salts and ammonia salts and said copolymer and interpolymer being present in a ratio of copolymer to interpolymer of from about 1 to about 10.

2. The composition of claim 1 wherein the salt of the interpolymer is a morpholine salt.

3. The composition of claim 1 wherein the salt of the interpolymer is an ammonia salt.

4. The composition of claim 1 wherein the particles of the copolymer are finely divided α-methyl styrene–acrylonitrile copolymer.

5. The composition of claim 1 wherein the particles of the copolymer are finely divided methyl methacrylate–butyl acrylate copolymer.

6. The composition of claim 1 wherein the particles of the copolymer are finely divided methyl methacrylate–α-methyl styrene copolymer.

7. A latex coating composition consisting essentially of finely divided hard particles of tert-butyl vinyl ether–acrylonitrile copolymer dispersed in an aqueous solution of the salt of maleic anhydride–tert-butyl vinyl ether–acrylonitrile interpolymer, said salt being selected from a group consisting of amine and ammonia salts and said copolymer and interpolymer being present in a ratio of copolymer to interpolymer of from about 1 to about 10.

8. A process of preparing a latex coating composition consisting essentially of the step of admixing an aqueous dispersion of finely divided hard particles of a copolymer of at least two ethylenically unsaturated monomers selected from the group consisting of acrylonitrile, acrylic acid, the esters of acrylic, fumaric and methacrylic acids with alcohols containing not more than 18 carbon atoms, styrene, alpha-methyl styrene, vinyl halides, vinyl ethers, and vinylidene halides with an aqueous solution of the salt of the interpolymer resulting from the polymerization of maleic anhydride with the monomeric components of the copolymer, said salt being selected from the group consisting of amine salts and ammonia salts and said copolymer and interpolymer being admixed in a ratio of copolymer to interpolymer of from about 1 to about 10.

9. A process according to claim 8 wherein the interpolymer salt is a morpholine salt.

10. A process according to claim 8 wherein the interpolymer salt is an ammonia salt.

11. The process according to claim 8 wherein the copolymer is α-methyl styrene–acrylonitrile copolymer.

12. The process according to claim 8 wherein the copolymer is methyl methacrylate–butyl acrylate copolymer.

13. The process according to claim 8 wherein the copolymer is methyl methacrylate–α-methyl styrene copolymer.

References Cited by the Examiner

UNITED STATES PATENTS

| | | | |
|---|---|---|---|
| 2,548,318 | 5/1951 | Norris | 260—29.6 |
| 2,686,736 | 8/1954 | Kuhn | 260—29.6 |
| 2,873,212 | 2/1959 | Roeser | 260—78.5 |

OTHER REFERENCES

Chem. Abs., vol. 49, p. 9960d (1955).

MURRAY TILLMAN, *Primary Examiner.*

W. H. SHORT, GEORGE F. LESMES, *Examiners.*

N. W. SHUST, J. A. SEIDLECK, J. L. WHITE,
*Assistant Examiners.*